United States Patent [19]

Maas

[11] Patent Number: 5,357,868
[45] Date of Patent: Oct. 25, 1994

[54] TROLLEY APPARATUS WITH REINFORCED PLASTIC WHEELS AND INTERLOCKING PLASTIC BUSHINGS

[75] Inventor: Nissim Maas, Kibbutz Mishmar Haemek, Israel

[73] Assignee: Tama Plastic Industry, Kibbutz Mishmar Ha'emek

[21] Appl. No.: 176,498

[22] Filed: Dec. 30, 1993

Related U.S. Application Data

[63] Continuation of Ser. No. 871,393, Apr. 21, 1992, abandoned.

[51] Int. Cl.⁵ .................. B61F 3/16; B61B 3/00; F16C 17/12; F16C 35/00
[52] U.S. Cl. .................. 105/180; 104/89; 104/95; 198/845; 16/45; 384/275; 384/441
[58] Field of Search .................. 101/89, 93, 95; 105/180, 218.1; 295/43; 198/845; 16/45, 46; 384/275, 249, 441

[56] References Cited

U.S. PATENT DOCUMENTS

| | | | |
|---|---|---|---|
| 2,759,592 | 8/1956 | Diagle | 104/93 X |
| 3,268,062 | 8/1966 | Gladstone | 104/95 X |
| 3,952,860 | 4/1976 | Specht | 198/189 |
| 4,109,343 | 8/1978 | Wels et al. | 16/98 |
| 4,178,856 | 12/1979 | Dunville | 104/95 |
| 4,228,738 | 10/1980 | Forshee | 104/95 |
| 4,294,712 | 10/1981 | Ueno et al. | 252/12 |
| 4,433,627 | 2/1984 | Forshee | 104/95 |
| 4,441,601 | 4/1984 | Rood | 193/37 |
| 4,467,911 | 8/1984 | Forshee | 198/648 |
| 4,467,913 | 8/1984 | Salloum | 198/687 |
| 4,471,867 | 9/1984 | Forshee | 198/687 |
| 4,484,525 | 11/1984 | Forshee et al. | 104/95 |
| 4,953,257 | 9/1990 | Seynhaeve | 16/45 |
| 5,209,167 | 5/1993 | Donner et al. | 105/180 |

FOREIGN PATENT DOCUMENTS

| | | |
|---|---|---|
| 2118232 | 11/1972 | Fed. Rep. of Germany . |
| 1394640 | 5/1925 | United Kingdom ........... 104/93 |
| 1391914 | 4/1975 | United Kingdom . |
| 2104467 | 3/1983 | United Kingdom ........... 104/89 |

OTHER PUBLICATIONS

Aaron Sternfield, "New Nylons Are Moving Into A Wide Range Of Specialized Applications", Modern Plastics International, Aug., 1987.
Greenline Corporation brochure, "X-348 Overhead Conveyors".
Designmark brochure "Extendaflex".

*Primary Examiner*—Robert J. Oberleitner
*Assistant Examiner*—S. Joseph Morano
*Attorney, Agent, or Firm*—Morgan & Finnegan

[57] ABSTRACT

A trolley assembly is provided including a pair of trolley brackets with an axle extending outwardly from each of the trolley brackets. Bushings adapted to rotatably engage each of the axles are provided with a wheel fixedly attached to each of the bushings. The bushings include an interlock to prevent rotation of the bushing with respect to the wheel. A pendant is attached to the pair of trolley brackets. The components of the trolley assembly can be replaced on a one-to-one basis with parts of prior art trolley assemblies.

27 Claims, 2 Drawing Sheets

TROLLEY APPARATUS WITH REINFORCED PLASTIC WHEELS AND INTERLOCKING PLASTIC BUSHINGS

This is a continuation of co-pending application Ser. No. 07/871,393, filed on Apr. 21, 1992, now abandoned.

BACKGROUND OF THE INVENTION

This invention relates to conveyor trolley assemblies. More particularly, this invention relates to trolley assemblies for overhead roller conveyors.

In most poultry processing plants there are overhead conveyor lines including picking lines, eviscerating lines, cut-up lines, and packing lines. The average length of a conveyor line is about 150 m. Running speed is about 13 m/min and usually the lines are operated two shifts a day. A complete overhead conveyor includes a chain, trolley assemblies, and H-attachments and pendants. All the parts are assembled and hung from an I-beam alloy track.

A complete trolley assembly is attached every 0.15 m along the line. In some cases, a complete trolley assembly is attached only every 0.30 m and, in between the trolley assemblies, an H-attachment and pendant are attached. Poultry (chickens, turkeys, etc.) having a weight of only about 3 kg are hung approximately every 0.15 m, although such lines are generally rated at about a 50 kg load per trolley.

The wheels of the trolley assemblies are designed to include ball bearings. In some designs, the outside and the inside races of the ball bearings are made of plastic material. A disadvantage of such designs is that the load which is created on the axle is transferred through the bearing balls which are located at any given moment only on the bottom side of the wheel. This means that most of the load is transferred only through one or two bearing balls. It is well known that a ball creates a very concentrated pressure when pressed between two flat panels. Theoretically, the load is concentrated on a point.

The pressure per given area created by the load is higher than permitted for any known thermoplastic material. As a result, "creep" occurs in the plastic parts. Creep in plastic is a moving of material from one area under a constant pressure to another area under less pressure. When creep increases during rotation, the distance between the inner race and the outer race (i.e., between the stationary and the rotating parts) increases to such a degree that a ball can escape from the wheel. As a result, the wheel either stops rotating immediately or the remaining balls also escape and then the wheel stops rotating. The higher the load, the greater the creep, and the shorter the performance life of the wheel.

There are some designs on the market in which a ball cage is used to prevent the balls from escaping. Such a design provides only a marginal advantage and increases the working life of the wheel by some percentage. Among the disadvantages are that the wheel is more expensive and amount of creep is the same.

Creep occurs all around the outside race (on its inside surface), but only on one side of the inner race (the stationary part). The result is that the inner race is no longer round in shape and therefore it becomes easier for the wheel to slip over the I-beam than to rotate on it.

An additional disadvantage of wheels designed with ball bearings is the high cross-section of the outer race (i.e., the wheel itself). A high cross-section is required because both the inner and outer surfaces of the outside race must be smooth. The inner surface, because of the bearing balls, and the outer surface, because it has to roll against the I-beam. This high cross-section poses significant disadvantages:

(1) A very long thermoplastic injection cycle is required;

(2) A substantial amount of thermoplastic material is needed;

(3) A substantial amount of shrinkage and deformation occurs creating lower quality plastic properties (increasing creep and outside abrasion of the wheel); and (4) A complicated assembly process for the ball bearings is required.

The bracket of the trolley assembly is generally drop forged and coated to prevent rusting. The trolley bracket is designed to be strong enough to hold a load of about 50 kg per bracket for at least 2 years of operation at 2 shifts per day. The weight of the trolley bracket is approximately 225 gr. The trolley bracket has a coating to prevent rust when working in a processing plant having a very high humidity level. Nonetheless, a substantial number of trolley brackets rust despite the fact that all the conveyor parts are replaced every one to two years.

Due to trolley assembly requirements, the thickness of the pendant should be 6 mm. The pendant is made of steel and is also plated to prevent rust. Consequently, the pendant is stronger than needed and weighs about 188 gr. Similarly, the H-attachment is drop forged or made of sheet metal and is coated to prevent rust. Weight of the steel H-attachment is approximately 89 gr.

SUMMARY OF THE INVENTION

With the foregoing in mind, it is an object of the invention to provide an improved trolley assembly for use in conveyor systems.

It is a further object of the invention to provide an improved wheel assembly for use in trolley assemblies of conveyor systems.

In accordance with the invention, a trolley assembly is provided including a pair of trolley brackets with an axle extending outwardly from each of the trolley brackets. Bushings adapted to rotatably engage each of the axles are provided with wheels fixedly attached thereto. A pendant is attached to the pair of trolley brackets.

Further in accordance with the invention, a wheel assembly is provided which is adapted to rotatably engage an axle including a wheel providing a flange and rib portion. Bushings are provided which are adapted to interconnect with the wheel and to rotatably engage the axle. An interlock to prevent rotation of the bushing with respect to the wheel is also provided.

Advantageously, the components of the trolley assembly can be replaced on a one-to-one basis with parts of the prior art trolley assembly.

BRIEF DESCRIPTION OF THE DRAWINGS

The accompanying drawings, referred to herein and constituting a part hereof, illustrate preferred embodiments of the invention and, together with the description, serve to explain the principles of the invention, wherein:

FIG. 3 is an exploded view of a wheel assembly in accordance with the instant invention;

FIG. 5 is a perspective view of a pendant;

DETAILED DESCRIPTION OF THE DRAWINGS

Figure 1:
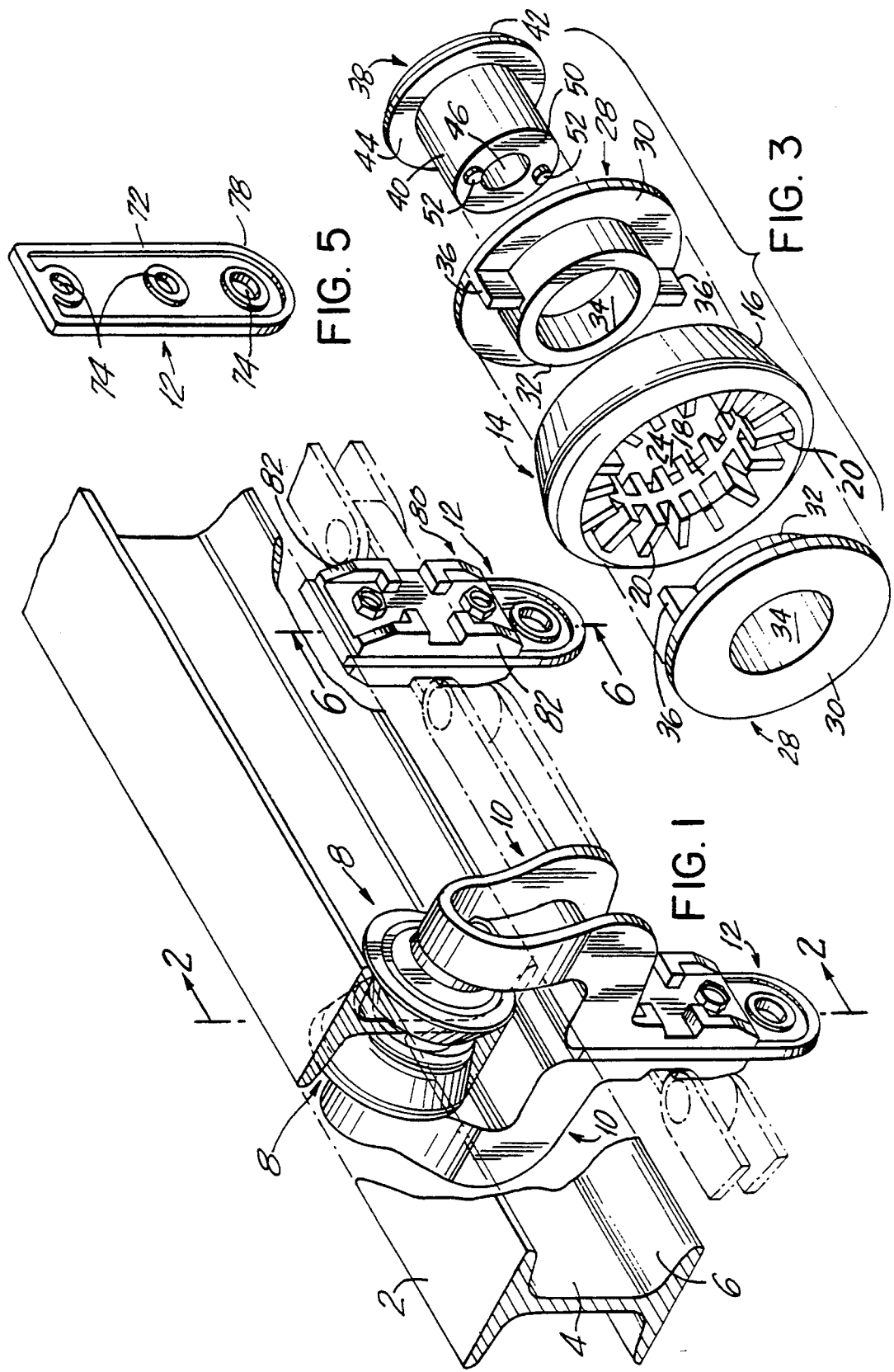
FIG. 1 is a perspective view of a trolley assembly and H-attachment assembly in accordance with the instant invention.
Figure 2:
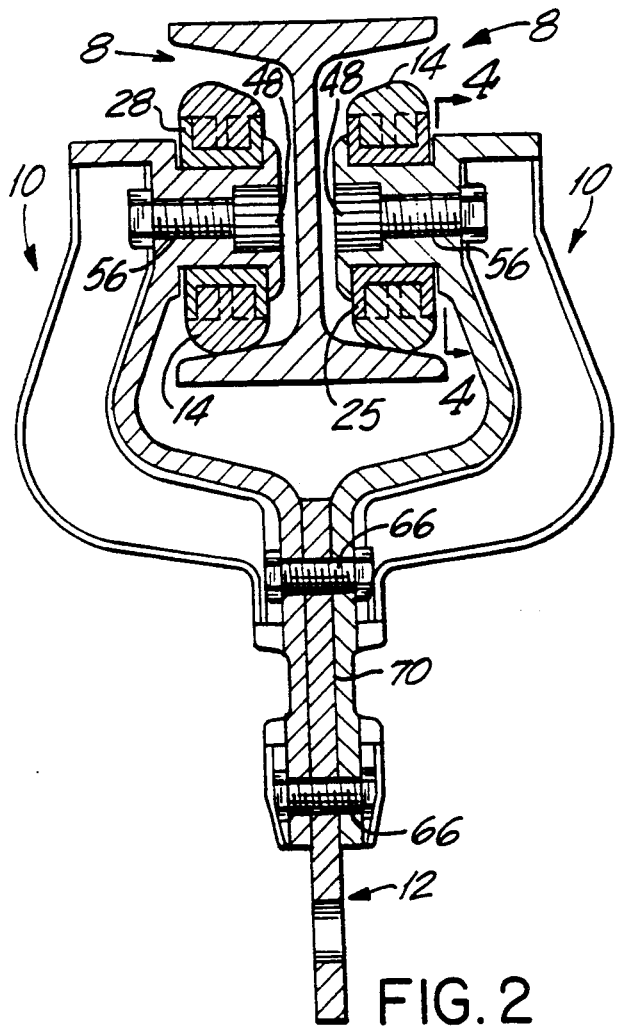
FIG. 2 is a front cross sectional view of the trolley assembly of FIG. 1.
Figure 4:
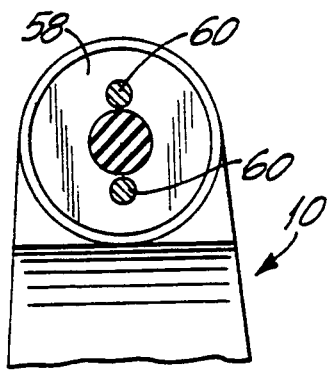
FIG. 4 is a front view of the axle face of the trolley bracket of FIG. 2.

FIGS. 1 and 2 show perspective and front cross sectional views, respectively, of a trolley assembly in accordance with the instant invention. The trolley assembly is adapted to work with X-348, X-347 and similar overhead conveyors as are available from Greenline Corporation (Charlotte, N.C.) and other suppliers. In particular, is shown a standard X-348 overhead conveyor I-beam 2 including web portion 4 and flange portion 6.

The trolley assembly includes basically three components; wheel assembly 8, trolley bracket 10, and pendant 12. Due to symmetry of the trolley assembly, it will be appreciated that two identical wheel assemblies and two identical trolley brackets (left and right) are used to make a complete trolley assembly. Only a single pendant is required for a complete trolley assembly. It will also be appreciated that the trolley assembly is adapted to have its wheel assemblies 8 run on flange portion 6 of I-beam 2. Sufficient space is provided between the right and left wheel assemblies 8 to prevent contact with the web portion 4 of I-beam 2. Similarly, sufficient space is provided between the right and left trolley brackets 10 to prevent contact with flange portion 6 of the I-beam 2.

In FIG. 3 is shown an exploded view of a wheel assembly in accordance with the instant invention. The wheel 14 is made of a thermoplastic material, e.g., polyacetal, and is preferably 57 mm in diameter with a face-to-face thickness of about 18 mm. A preferred thermoplastic material is ULTRAFORM-2320 from BASF. Wheel 14 has an annular surface 16 with a taper of approximately 20° with respect to the center line of the wheel. It will be appreciated that the annular surface 16 could also have a round or flat shape as may be desired for a particular application. On the inside of wheel 14 is web portion 18 with ribs 20 which extend radially inward toward through hole 24. The web and the ribs are preferably 2.5 mm in thickness. It will be appreciated from the figures that ribs 20 may be provided on both sides of flange 18. It will be further appreciated that the ribs do not extend all the way to the side wall of the wheel. Rather, they may be recessed approximately 2.5 mm thereby providing a recess in the side wall of the wheel.

Advantageously, the wheel is designed such that more than 70% of the wheel is made of flange and ribs having a wall thickness of only 2.5 mm and only at the annular outer surface (the portion which rotates against the I-beam) does the wall thickness increase to about 7 mm. In contrast, the wall thickness of prior art wheels is about 15-17 mm.

In FIG. 3 is also shown a bushing of the wheel assembly 8. Bushing 28 includes face portion 30 and collar 32 and provides a through hole 34. The bushing 28 is made of an internally lubricated thermoplastic, e.g., polyacetal. A preferred thermoplastic material is Delrin AF313 from DuPont which has a lubricant in the material. The face portion preferably has a thickness of 2.5 mm and the collar portion preferably has a thickness of 4 mm. On the back of the face portion is provided at least one rib 36 having a thickness of 2.5 mm.

FIG. 3 further shows an axle of the wheel assembly 8. The axle 38 is preferably made of reinforced nylon. A preferred reinforced nylon material is RTP-205 from Fiberit Corp. Axle 38 includes side bearing surface 40, beveled head 42, and shoulder 44. The axle provides through hole 46 with recess 48 adapted to contain a bolt head therein. (See FIG. 2.) If desired, the recess may be adapted to capture the bolt head and prevent its rotation by making recess 48, for example, six sided. Alternatively, the recess may be adapted to capture the nut of a bolt. It will be appreciated that the recess 48 may be designed to capture any configuration of bolt head or nut. On the opposite side of axle 38 from recess 48 is mating face 50 which includes at least one pin 52 having a preferred diameter of 3 mm. For applications wherein the wheel assembly of the invention is intended to replace prior art wheel assemblies and to be used with a metal trolley bracket, it is preferable to produce the axle 48 without pins 52.

It will be appreciated that, when assembled with a bushing 28 and a wheel 14, cylindrical bearing surface 40 and shoulder 44 of axle 38 are adapted to rotatably contact the inside of collar 32 and the front of face portion 30 of bushing 28. Advantageously, shoulder 44 prevents axial movement of the wheel 14 and beveled head 42 of axle 38 provides a smoother profile to the wheel assembly when in use.

FIG. 2 shows a cross sectional view of a complete wheel assembly. As may be appreciated from FIG. 2, a bushing 28 is inserted on either side of the wheel 14 and due to symmetry of the inside configuration of the wheel, two identical bushings may be used for each wheel. When the bushing is inserted into the wheel, ribs 36 of bushing 28 interlocks with ribs 20 of wheel 14 preventing rotation of the bushing with respect to the wheel. It will be appreciated that face portion 30 of bushing 28 recesses into the recess in the side wall of wheel 14 to present a substantially smooth surface to the bushing/wheel interface.

It may be appreciated that there are distinctly different physical requirements for the inside and outside surfaces of the wheel. The outside surface (the circumference of the wheel) must be smooth in order to roll well against the I-beam. The outside surface should also preferably be from a material with a low wear factor and the proper friction to prevent the wheel from slipping against the I-beam rather than rolling. The inside surface must be very smooth, but with a minimum possible coefficient of friction and abrasion, in order to permit excellent rotation against the axle.

In order to meet these different physical requirements, the wheel/bushing assembly in accordance with the invention is provided. The bushing is produced from a special plastic material having an inherent lubricant, such as Delrin AF313 from DuPont. The bushings interconnected with the wheel. The bushing has integral ribs which are located between the ribs of the wheel. The wheel with the two bushings (one on each side) may then act as one part which is made of two different materials.

An additional advantage of the invention is that the bushing also prevents friction and abrasion between the wheel and the trolley bracket and between the wheel and the axle-both in the axial direction. Axial forces are created because of the horizontal distance between the load and the wheels and because of the sloped flange portion of the I-beam.

Advantageously, the wheel assembly according to the invention creates a chamber between the bushing 28 and the wheel 14. This chamber not only saves material and improves the properties of the parts, but also can be used as a vessel for grease or other lubricants for trolley applications other than in processing plants. For such applications, the bushing 28 may be designed to be sealed around the wheel 14, and a clearance provided between the two bushings to allow lubricant to exit from the chamber through the clearance between bushings 28 and the axle 38. For such an application, a special greasing thread as are known in the art may also be provided.

The wheel assembly according to the invention overcomes numerous disadvantages of prior art wheels:
(1) The thermoplastic injection cycle for production of wheels is reduced by about 300–500%;
(2) A very high quality product is attained due to having a uniform and low wall thickness all over the product (shrinkage is 300–500% less when compared to the prior art) because excellent filling of the part can be obtained;
(3) The wheel weighs less than 50% of the weight of the prior art wheels; and
(4) There is no need for a ball bearing assembly process.

FIGS. 1 and 2 show perspective and cross sectional views respectively of the trolley bracket in accordance with the instant invention. The trolley bracket is preferably made of reinforced nylon. A preferred reinforced nylon material is Nylon 6/6 ADEL AR-16 from Adel Plastics. At the upper end of trolley bracket 10 is provided through hole 56 and axle face 58 which is designed to allow free rotation against face portion 30 of bushing 28 of the wheel assembly 8. In axle face 58 is provided at least one pin recess 60 which is adapted to accept pin 52 from axle 38 in the trolley assembly creating an interlock to prevent rotation of the axle should the connecting bolt loosen. It will be appreciated that the upper portion of trolley bracket 10 is generally U-shaped in cross-section and includes an essentially flat portion preferably 5 mm in thickness with stiffening ribs on either side, again preferably 5 mm in thickness. On the lower portion of trolley bracket 10 is provided pendant face 70 which is adapted to mate with a pendant. The face-to-face distance between axle face 58 and pendant face 70 is preferably about 26 mm. On the lower portion of trolley bracket 10 are provided bolt holes 66 for attaching the trolley bracket to another similar trolley bracket and a pendant to form a trolley assembly.

The trolley bracket has been designed to have a moment of inertia such that the bending stresses are maintained low enough to permit carrying a continuous load of at least 100 kg per bracket. The surface of the trolley bracket is preferably very smooth with high radii in order to prevent any accumulation of dirt. As the conveyor chain moves and pushes the trolley assembly, substantial friction is created between the chain and the trolley bracket. Since the prior art trolley bracket was made of steel, substantial abrasion occured. Such abrasion is reduced when using a plastic bracket against a metal chain.

FIGS. 5 and 2 show perspective and cross sectional views, respectively, of a pendant 12 of the trolley assembly. The pendant has a preferred thickness of 5 mm. In order to conform with standard pendant dimensions, there is an additional peripheral rib 72 of 0.5 mm on both sides to create a 6 mm thickness. Pendant 12 is preferably made of reinforced nylon. A preferred reinforced nylon material is ADEL AR-16 from Adel Plastics. Pendant 12 provides through holes 74 for connection with trolley brackets 10. Pendant 12 is adapted to be mated between two pendant faces of opposing trolley brackets. Pendant 12 presents a rounded lower end 78 to the trolley assembly. The weight of the pendant made according to the invention is about 29 gr.

Figure 6:
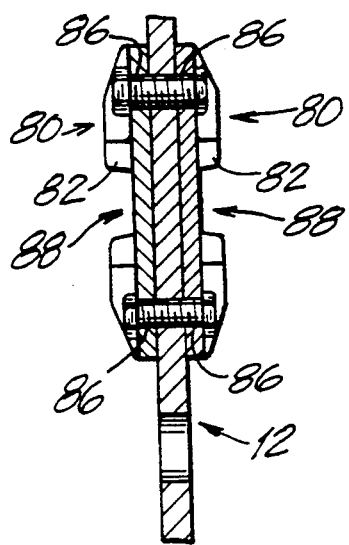
FIG. 6 is a front cross sectional view of the H-attachment assembly of FIG. 1.

FIGS. 1 and 6 show perspective and cross sectional views, respectively, of an H-attachment assembly, including two H-attachments and a pendant, as may be used with the trolley assembly. The H-attachment is preferably made of a reinforced nylon. A preferred reinforced nylon is ADEL AR-16 from Adel Plastics. The H-attachment 80 has a substantially planar surface preferably 4 mm in thickness with stiffening ribs 82 and including bolt holes 86 to attach one such H-attachment on each side of a pendant 12. Stiffening ribs 82 also define a channel portion 88 for the conveyor chain similar to the channel portion in the trolley assembly. The weight of the H-attachment made according to the invention is only 18 gr while a prior art metal H-attachment weighs about 80 gr.

Advantageously, the components of the trolley assembly—i.e., the wheel assembly, the trolley bracket, the pendant and the H-attachment assembly—can be replaced on a one-to-one basis with parts of prior art trolley assemblies.

Figure 7:
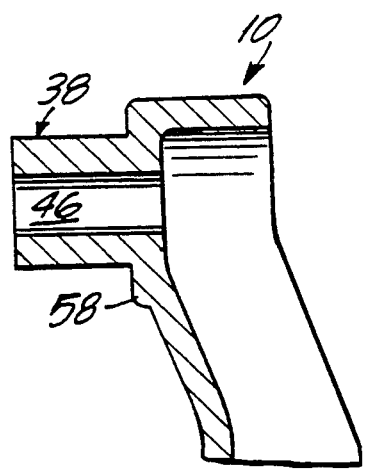
FIG. 7 is a partial cross sectional view of an alternate embodiment of the invention wherein the axle and trolley bracket are intergrally formed.

While the invention has been described in its preferred embodiments, it is to be understood that the words which have been used are words of description, rather than limitation, and that changes may be made within the purview of the appended claims without departing from the true scope and spirit of the invention in its broader aspects. For example, although the axle and trolley bracket are described herein as being two separate components, the trolley bracket may be integrally formed with the axle as shown in FIG. 7. This arrangement may be preferable for certain applications and results in fewer individual components for the trolley assembly.

What is claimed:
1. A trolley assembly, comprising:
a pair of trolley brackets;
an axle extending outwardly from each of said trolley brackets;
at least one bushing rotatably engaging and supporting each of said axles;
a wheel fixedly attached to each of said bushings and including a radially extending flange portion and stiffening ribs extending axially therefrom; and
a pendant attached to said pair of trolley brackets; wherein said axle, said bushing and said wheel are made of polymer material and said bushing has an axially extending rib adapted to interlock with said stiffening ribs to prevent rotation of the bushing with respect to the wheel.

2. A trolley assembly in accordance with claim 1, wherein said axle is integrally formed with each of said trolley brackets.

3. A trolley assembly in accordance with claim 1, wherein said pendant is integrally formed with at least one of said trolley brackets.

4. A trolley assembly in accordance with claim 1, wherein an outer annular surface of said wheel has a taper of approximately 20°.

5. A trolley assembly in accordance with claim 1, wherein an outer annular surface of said wheel is round.

6. A trolley assembly in accordance with claim 1, wherein an outer annular surface of said wheel is flat.

7. A trolley assembly in accordance with claim 1, wherein said bushing is recessed into the side of said wheel.

8. A trolley assembly in accordance with claim 1, wherein said bushing and said wheel define an enclosed chamber.

9. A trolley assembly in accordance with claim 1, wherein said trolley bracket is made of reinforced nylon.

10. A trolley assembly in accordance with claim 1, wherein said wheel is made of polyacetal.

11. A trolley assembly in accordance with claim 1, wherein said bushing is made of polyacetal treated with lubricant.

12. A trolley assembly in accordance with claim 1, wherein said trolley bracket is generally U-shaped and of substantially uniform thickness.

13. A trolley assembly in accordance with claim 1, further comprising an interlock to prevent rotation of the axle with respect to the trolley bracket.

14. A trolley assembly in accordance with claim 1, wherein each of said trolley brackets provides a surface for rotatably engaging said at least one bushing.

15. A trolley assembly in accordance with claim 1, further comprising an H-attachment assembly including at least one H-attachment and a pendant.

16. A trolley assembly in accordance with claim 15, wherein said at least one H-attachment and said pendant are integrally formed.

17. A trolley assembly in accordance with claim 15, wherein said H-attachment and said pendant are made of reinforced nylon.

18. A wheel assembly, comprising:
an axle;
a wheel providing a radially extending flange and a rib portion extending axially therefrom;
at least one bushing adapted to interconnect with said wheel and to rotatably engage and support said axle; and
an axially extending rib on said bushing adapted to interlock with said rib portion to prevent rotation of the bushing with respect to the wheel;
wherein said axle, said wheel and said bushing are made of polymer material.

19. A wheel assembly in accordance with claim 18, wherein an annular surface of said wheel has a taper of approximately 20°.

20. A wheel assembly in accordance with claim 18, wherein an annular surface of said wheel is round.

21. A wheel assembly in accordance with claim 18, wherein an annular surface of said wheel is flat.

22. A wheel assembly in accordance with claim 18, wherein said at least one bushing comprises a bushing provided on each side of the wheel.

23. A wheel assembly in accordance with claim 18, wherein said at least one bushing is recessed into the side of the wheel.

24. A wheel assembly in accordance with claim 18, wherein a chamber is defined when said bushing is interconnected with said wheel.

25. A wheel assembly in accordance with claim 18, wherein a gap is provided to allow for movement of lubricant.

26. A wheel assembly in accordance with claim 18, wherein said wheel is made of polyacetal.

27. A wheel assembly in accordance with claim 18, wherein said bushing is made of polyacetal having a lubricant.

* * * * *

UNITED STATES PATENT AND TRADEMARK OFFICE
CERTIFICATE OF CORRECTION

PATENT NO. : 5,357,868
DATED : October 25, 1994
INVENTOR(S) : Nissim Mass

It is certified that error appears in the above-indentified patent and that said Letters Patent is hereby corrected as shown below:

On the title page, on line 2, the line immediately following "United States Patent [19]", "Maas" should read --Mass--.

On the title page, on line 6, field "[75] Inventor", "Nissim Maas" should read --Nissim Mass--.

Signed and Sealed this

Thirty-first Day of January, 1995

*Attest:*

BRUCE LEHMAN

*Attesting Officer*  *Commissioner of Patents and Trademarks*